United States Patent
den Hartog et al.

(10) Patent No.: US 9,756,188 B2
(45) Date of Patent: Sep. 5, 2017

(54) METHOD AND TELECOMMUNICATION SYSTEM FOR INITIATING AN ENHANCED COMMUNICATION CONNECTION

(75) Inventors: Jos den Hartog, SE Capelle a/d Ijssel (NL); Rakesh Taori, Suwon (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1748 days.

(21) Appl. No.: 11/568,959

(22) PCT Filed: May 10, 2004

(86) PCT No.: PCT/EP2004/005035
§ 371 (c)(1),
(2), (4) Date: Aug. 14, 2007

(87) PCT Pub. No.: WO2005/109796
PCT Pub. Date: Nov. 17, 2005

(65) Prior Publication Data
US 2008/0069084 A1  Mar. 20, 2008

(51) Int. Cl.
*H04M 7/00* (2006.01)
(52) U.S. Cl.
CPC .................................. *H04M 7/0057* (2013.01)
(58) Field of Classification Search
None
See application file for complete search history.

(56) References Cited

U.S. PATENT DOCUMENTS

| | | | |
|---|---|---|---|
| 4,080,517 A * | 3/1978 | Moricca et al. ................ 379/52 |
| 5,428,608 A | 6/1995 | Freeman et al. |
| 5,937,057 A * | 8/1999 | Bell et al. ................ 379/265.02 |
| 6,111,866 A * | 8/2000 | Kweon ................ H04W 76/02 370/335 |
| 6,370,137 B1 | 4/2002 | Lund |
| 6,389,119 B1 * | 5/2002 | McBride ................ H04M 11/00 370/352 |
| 6,750,897 B1 * | 6/2004 | Moshrefi et al. .......... 348/14.08 |
| 6,847,821 B1 * | 1/2005 | Lewis et al. ................ 455/452.2 |
| 7,277,424 B1 * | 10/2007 | Dowling ........................ 370/352 |
| 7,366,183 B1 * | 4/2008 | Sylvain ..................... 370/395.61 |
| 7,496,360 B2 * | 2/2009 | Sindhwani et al. ........ 455/422.1 |
| 2002/0111167 A1 * | 8/2002 | Nguyen ................ H04W 8/04 455/435.1 |
| 2003/0074451 A1 * | 4/2003 | Parker et al. .................. 709/227 |
| 2003/0220835 A1 * | 11/2003 | Barnes, Jr. ..................... 705/14 |
| 2004/0008837 A1 * | 1/2004 | Sylvain .................... 379/265.09 |

(Continued)

*Primary Examiner* — Faruk Hamza
*Assistant Examiner* — Cassandra Decker

(57) ABSTRACT

The invention relates generally to a method for initiating an enhanced communication connection, between a calling party (A) and a called party (B), within a telecommunication network system comprising multiple interconnected networks, said enhanced communication connection comprising a circuit switched connection and a packet-switched connection, the method according to the invention is characterized in the steps of processing the setting up of said circuit-switched connection and said packet-switched connection based on one single response invoked by said called party (B). In one embodiment of the method the single response could be the pressing of a button or the selection of a displayed icon on a terminal.

12 Claims, 4 Drawing Sheets

(56) References Cited

U.S. PATENT DOCUMENTS

2005/0088513 A1* 4/2005 Oswald ................ H04N 7/147
 348/14.02
2007/0186002 A1* 8/2007 Campbell .............. H04N 7/142
 709/231

* cited by examiner

US 9,756,188 B2

METHOD AND TELECOMMUNICATION SYSTEM FOR INITIATING AN ENHANCED COMMUNICATION CONNECTION

FIELD OF THE INVENTION

The invention relates generally to a method for initiating an enhanced communication connection, between a calling party (A) and a called party (B), within a telecommunication network system comprising multiple interconnected networks, said enhanced communication connection comprising a circuit switched connection and a packet-switched connection, said method comprising of at least the steps of:
  setting-up said circuit-switched connection and said packet-switched connection of the enhanced communication connection between party (A) and party (B);
  alerting said called party (B) about the setting up of said circuit-switched connection and said packet-switched enhanced connection;
  processing of said setting-up of said circuit-switched connection and/or said packet-switched connection using a Circuit Switched Response (CSR) or Packet Switched Response (PSR).

The invention furthermore relates to a telecommunications network system comprising multiple interconnected networks, arranged for establishing an enhanced telephone connection between a calling party (A) and a called party (B) and wherein said enhanced telephone connection comprises a circuit-switched connection and a packet-switched connection.

Moreover the invention relates to a telecommunication device (terminal) capable of supporting an enhanced connection based on having simultaneously (in parallel) a circuit-switched connection (call) and a packet-switched connection.

An enhanced connection could be envisioned as for instance, besides, or instead of a ringing signal as on a traditional phone, the called party getting a pop-up menu presenting additional information like a business card, a photography of the caller, etc. Another example of the enhanced connection is for the caller itself when the called party is not available. Instead of a congestion tone, on a traditional phone indicating that the call is not answered, the calling party can get more information.

BACKGROUND OF THE INVENTION

Modern telecommunications systems comprise a plurality of interconnected telecommunications networks, among others a wired or fixed telecommunications network, such as the Public Switched Telecommunications Network (PSTN) or the Integrated Services Digital Network (ISDN), and wireless cellular radio or mobile telecommunications networks, such as operating in accordance with the Global System for Mobile communications (GSM) or the Universal Mobile Telecommunications System (UMTS) standard.

At the moment the telecommunications network can be built based on two main technologies, which are circuit-switched and packet-switched. In a circuit-switched network a physical path is obtained for and dedicated to a single connection between a calling party and the called party for the duration of the connection. In a packet-switched network relatively small units of data called packets are routed through a network based on the destination address contained within each packet. Breaking communication down into packets allows the same data path to be shared among many users in the network. (Most traffic over the Internet uses packet switching and the Internet is basically a connectionless network).

The phenomenal growth in popularity of the Internet has resulted in a tremendous interest in using packet-switched network infrastructures (e. g., those based on IP addressing) as a replacement for the existing circuit-switched network infrastructures used in today's telephony. From the network operators' perspective, the inherent traffic aggregation in packet-switched infrastructures allows for a reduction in the cost of transmission and the infrastructure cost per end-user.

However, discarding all investment made in circuit-switched networks and changing over to an all packet-switched network is not a sound proposition from an economical point of view. Coupled with the huge investments to obtain a worldwide all packet-switched network that is able to support voice, data, video, etc. it is a sounder proposition to establish an evolution path from circuit-switched networks towards a viable all-IP network. The evolution toward all-IP begins with the simultaneous/parallel use of the circuit-switched and packet-switched network to deliver combinational/multimedia services.

The simultaneous use of the circuit-switched network and packet-switched network for initiating a connection between calling and called party can result in an alerting signal on both networks. The present technology requires that both the circuit-switched and packet-switched network independently process the alerting signal resulting in a slower handling of said alerting signal, in a less efficient use of the telecommunications network and more errors (user forgets to respond to one of the alerting).

At this moment no provisions are known or implemented in the present telecommunications system allowing for a fast, efficient and error proof response from the called party and where the packet-switched network and circuit-switched network cooperate to process the alerting of the enhanced connection.

SUMMARY OF THE INVENTION

It is an object of the present invention to provide an improved method, system and hardware for a faster, more efficient and error proof connection set-up or connection rejection and wherein the circuit-switched network and packet-switched network cooperate to process the alerting.

The above objects are achieved as the method according to the invention is characterized in the steps of processing the setting up of said circuit-switched connection and said packet-switched connection based on one single response invoked by said called party (B). In one embodiment of the method the single response could be the pressing of a button or the selection of a displayed icon on a terminal.

In specific embodiments of the method according to the invention, said method is further characterized by the step of refusing said circuit-switched connection and packet-switched connection being established based on said invoked single response, or by the step of accepting one of said circuit-switched connection and packet-switched connection being established and refusing said other one of said circuit-switched and packet-switched connection being established based on said invoked single response, or by the step of invoking one of said circuit-switched response or packet-switched response based on said single response and invoking said other of said circuit-switched response or packet-switched response based on said one of said circuit-switched response or packet-switched response. These features result in the acceptance, refusal of an enhanced connection or a connection consisting of a packet-switched connection or circuit-switched connection based on one single response invoked by the called party (B).

In a further functional embodiment the method according to the invention is characterized by the step of invoking said other of said circuit-switched response (CSR) or packet-switched response (PSR) in the terminal of said called party (B).

Furthermore the method may be further characterized by the step of invoking said other of said circuit-switched response or packet-switched response in the telecommunication network system.

With these features for example, the pressing of a single button results in a correct sequence of signals in order to establish an enhanced connection. As stated above, it could also result in the refusal of the enhanced connection, or the establishment of a packet-switched connection or circuit-switched connection, depending on for example, which button has been pressed.

A further improvement in the establishment of an enhanced telecommunications connections between two parties achieved by the method step of invoking said other of said circuit-switched response or packet-switched response in the terminal of said called party B. The acceptance, refusal, etc. of the packet-switched or circuit-switched alerting can be initiated on for example the circuit-switched part of the terminal and this information is transmitted directly to the packet-switched part of the terminal without intervention of the telecommunications network.

Furthermore the method according to the invention may include the step of invoking said other of said circuit-switched response or packet-switched response in the telecommunication network system. With this embodiment the telecommunication connection is further processed via the packet-switched and circuit-switched telecommunication networks.

With these features for example the packet-switched part of the terminal is informed of the response of the circuit-switched of the terminal. In this case the information is sent through the communications network.

The telecommunications system according to the invention is arranged in further processing said circuit-switched connection and packet-switched connection based on said invoked single response.

BRIEF DESCRIPTION OF THE DRAWINGS

The invention will now be described in more detail using the accompanying drawings, which show in.

DETAILED DESCRIPTION

Figure 1:
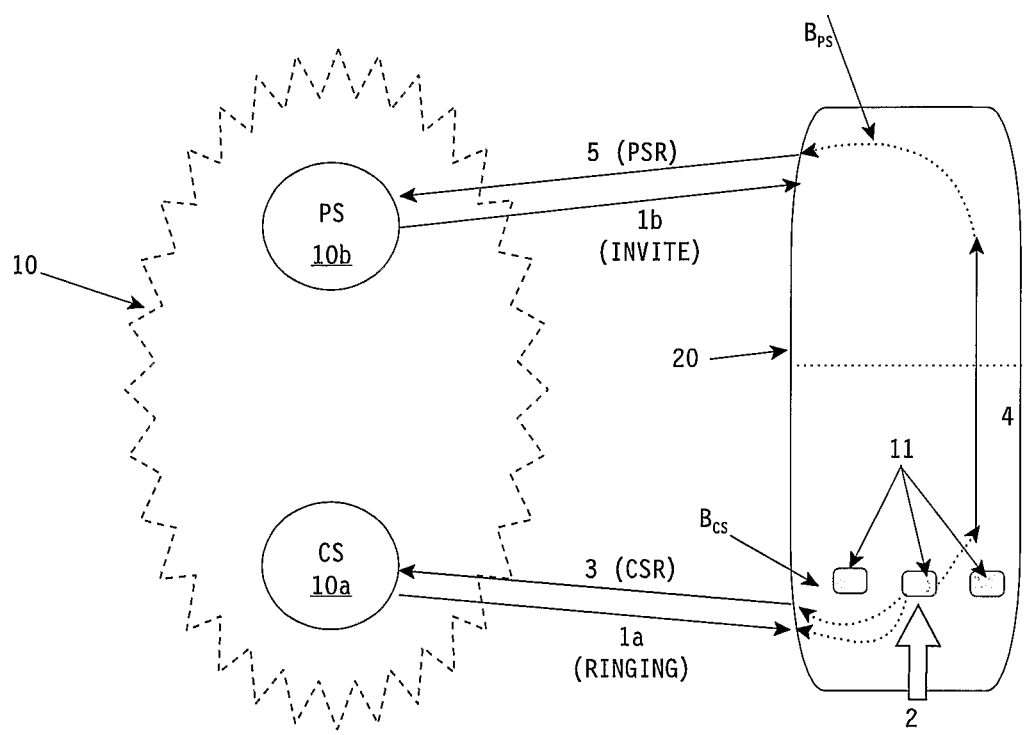
FIG. 1: a schematic overview of the signal sequence for setting-up an enhanced connection when alerting acceptance is performed on the $B_{cs}$, part of the terminal.

The present invention can be incorporated in several embodiments to solve the above stated objectives of the invention, a first embodiment being based on the sending of the response information from one part of the terminal e.g. circuit-switched ($B_{cs}$) part, to the other part of the terminal, e.g. packet-switched ($B_{ps}$) part without the use of the communications network. A further embodiment being based on the sending of the response information from one part of the terminal e.g. $B_{cs}$ part, to the other part of the terminal, e.g. $B_{ps}$ by means of the communications network.

The embodiments require that the communications terminal is capable of having a circuit-switched connection and packet-switched (or data) connection going on in parallel. The parts of the terminal involved with the circuit-switched connection and the packet-switched connection are identified by $B_{cs}$ and $B_{ps}$ respectively as can be seen in FIGS. 1-4. A generally accepted name used for this type of terminals is Dual Transfer Mode (DTM) terminal.

In a first embodiment of the invention (FIGS. 1 and 2), the circuit-switched alert (1a) and packet-switched alert (1b) are sent to the communications terminal (20). The user of the terminal can invoke a single response (2) to the alerting by pressing for example a key (11) of a keypad or selecting a displayed icon (11b) or eventually by voice. It is also possible that the terminal automatically responds to the alerting after a certain time-out. If the alerting is accepted by the $B_{cs}$ part of the terminal, a signal (3) is generated indicating to the circuit-switched network (10a) that the alerting has been accepted, and also a signal (4) is generated indicating to the $B_{ps}$ part of the terminal that the alerting has been accepted. The $B_{ps}$ part of the terminal signals (5) to the packet-switched network (10b) that the alerting has been accepted. As this signal (5) is automatically generated there is no possibility that the packet-switched network (10b) keeps waiting for a response to its packet-switched alerting. This results in a faster enhanced connection set-up.

Figure 2:
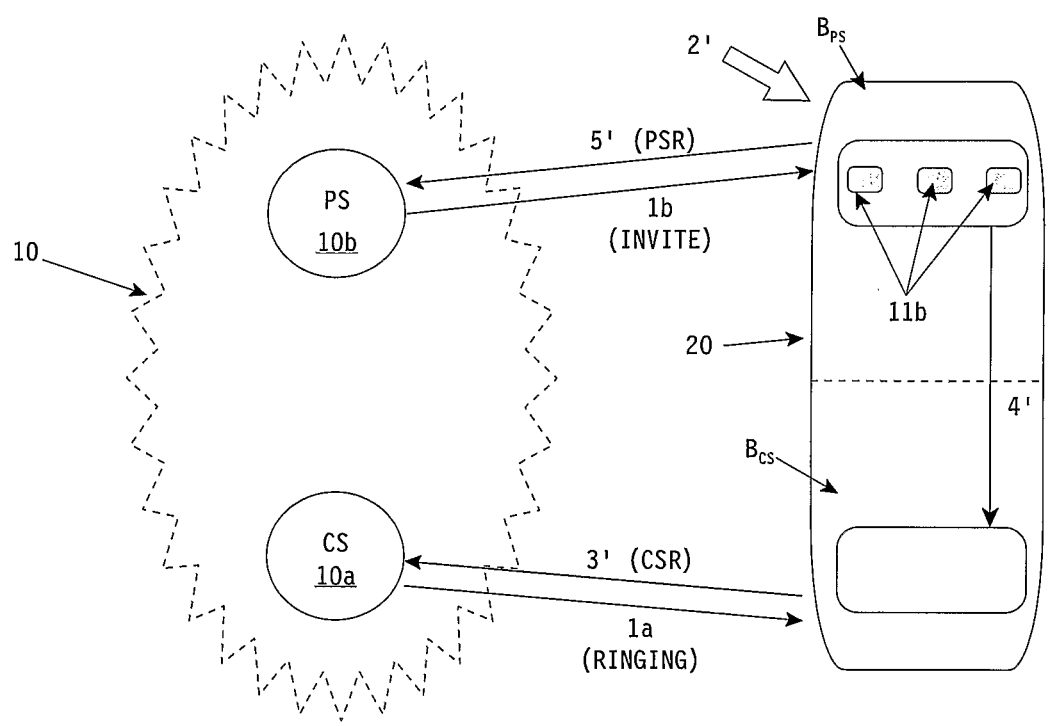
FIG. 2: a schematic, terminal based solution, overview of signal sequence for setting-up an enhanced connection when alerting acceptance is performed on the packet-switched part ($B_{ps}$) of the terminal.
Figure 3:
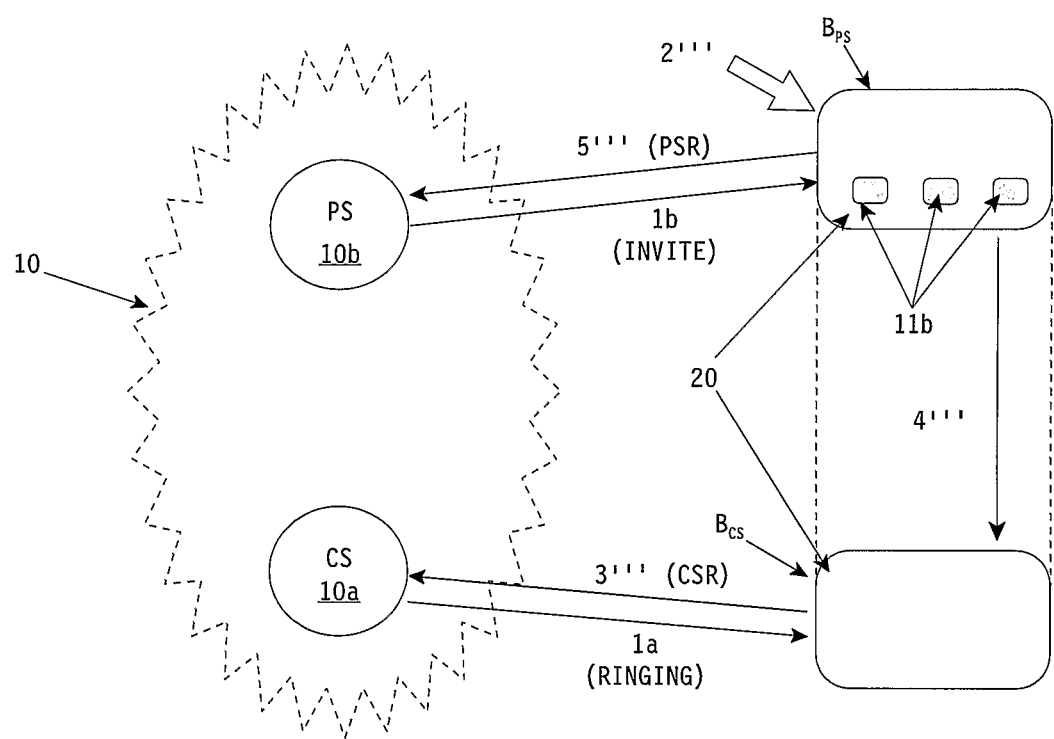
FIG. 3: a schematic, terminal based solution, overview of signal sequence for setting-up an enhanced connection when alerting acceptance is performed on the packet-switched part ($B_{ps}$) of the terminal and where the circuit-switched and packet-switched part of the terminal are separate units.

In a similar way (FIGS. 2 and 3) a packet-switched alerting (1b) and circuit-switched alerting (1a) can be further processed by a single invoked response (2'; 2''') on the $B_{ps}$ part of the terminal (20) (FIG. 2). In this terminal based embodiment the $B_{cs}$ and $B_{ps}$ part of the terminal (20) can be physically one unit (FIGS. 1, 2) or separated units connected to each other by means of a wired or wireless connection (FIG. 3).

The above description is not only valid for the accepting both the packet-switched and circuit-switched alerting (1b; 1a), but also for the rejection of the circuit-switched alerting and the acceptance of the packet-switched alerting, the acceptance of the circuit-switched alerting and the rejection of the packet-switched alerting and the rejection of both the circuit-switched and packet-switched alerting. This embodiment requires a new (maybe vendor-specific) API (Application Program Interface) through which for example the Bps part of the terminal can ask the Operating System (OS) of the terminal to be notified (4') when the circuit-switched part of the terminal has responded to an alerting.

In another embodiment (FIG. 4), which is a network-based solution the response to the circuit-switched and packet-switched alert is delivered to the network (10).

This signal (3'''') can be monitored in a service within the circuit-switched telephony network (10a). A service within this circuit-switched network can notify (4'''') the packet-switched network (10*b*). The packet-switched network (10*b*) can send a new message (indicated with reference numeral 4'''') or "ANSWERED" to the $B_{ps}$ part of the DTM-terminal. As a result of this signal notification (4'''') the packet-switched part of the network (10*b*) is informed of the acceptance of the alerting by the $B_{cs}$ part of the terminal. As this so-called packet-switched response (PSR) signal (5'''') is automatically generated there is no possibility that the packet-switched network (10*b*) keeps waiting for a response to its packet-switched alerting (1*b*). This results in a faster enhanced connection set-up.

This embodiment requires an (standard or proprietary) extension to the packet-switched application and that the $B_{ps}$ part of the terminal must be upgraded. Since the packet-switched application can be implemented as a software package, e.g. Java 2 Platform Micro Edition (J2ME) application, each terminal that can download J2ME-applications can implement this embodiment. Because the interaction between the packet-switched part of the terminal and the circuit-switched part of the terminal is not handled within the terminal, but via the communications network (10, 10*a*, 10*b*), there are no requirements on API's within the terminal.

Figure 4:
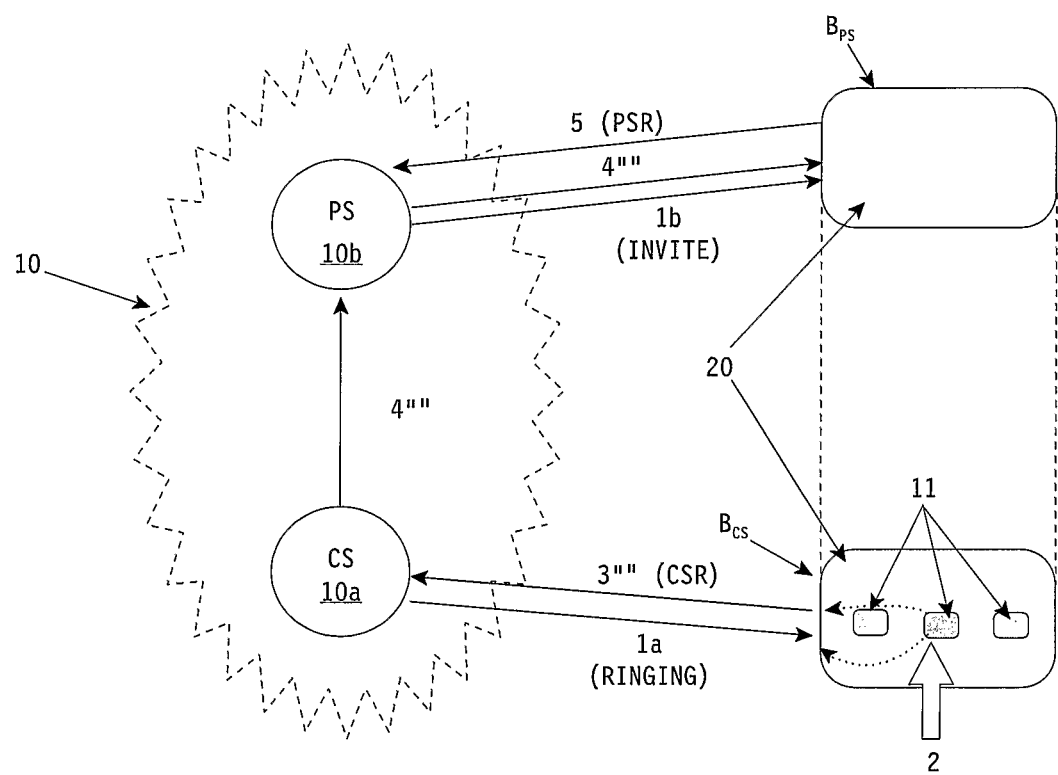
FIG. 4: a schematic overview of signal sequences for setting-up an enhanced connection when alerting acceptance is performed on the circuit-switched part ($B_{ps}$) of the terminal and where the circuit-switched and packet-switched part of the terminal are separate units.

This embodiment is applicable even when the circuit-switched part $B_{cs}$ and the packet-switched part $B_{ps}$ are physically on two different units, i.e. it does not require that the packet-switched application and the $B_{cs}$ part be implemented on the same terminal (FIG. 4). So, this embodiment allows for the possibility that the packet-switched application runs on a Personal Computer and the voice-call is delivered to a phone. Such a combination serves well to realize the long promised "Computer Telephony Integration (CTI)".

The invention claimed is:

1. A method for initiating a communication connection between a calling party and a called party within a telecommunication network system comprising multiple interconnected networks, said method comprising the steps of:
    initiating, in a circuit-switched network of the telecommunication network system, a circuit-switched connection between the calling party and the called party, and initiating, in a packet-switched network of the telecommunication network system, a packet-switched connection between the calling party and the called party;
    alerting a circuit-switched part of a terminal of said called party with a first alert signal about the initiation of said circuit-switched connection;
    alerting a packet-switched part of the terminal of said called party with a second alert signal about the initiation of said packet-switched connection;
    after alerting said called party with said first and second alert signals, receiving a circuit-switched response at the circuit-switched network and a packet-switched response at the packet-switched network, both the circuit-switched and packet-switched responses being triggered by a single response received at the terminal from the called party at one of the circuit-switched part and the packet-switched part of the terminal in response to said first and second alert signals; and
    based on the single response, indicating to the other one of the circuit-switched part and the packet-switched part of the terminal whether the terminal accepts establishment of a corresponding one of the circuit-switched or packet-switched connections,
    wherein the circuit-switched and packet-switched responses indicate to the respective circuit-switched and packet-switched networks:
        whether the circuit-switched part of the terminal accepts establishment of said circuit-switched connection, and
        whether the packet-switched part of the terminal accepts establishment of said packet-switched connection.

2. The method according to claim 1, further comprising the step of accepting one of said circuit-switched connection or packet-switched connection and refusing said other one of said circuit-switched connection or packet-switched connection based on said single response.

3. The method according to claim 1, further comprising:
    invoking one of said circuit-switched response or said packet-switched response based on said single response and invoking said other of said circuit-switched response or packet-switched response upon determining said one of said circuit-switched response or packet-switched response has been invoked.

4. The method according to claim 3, further comprising the step of invoking said other of said circuit-switched response or packet-switched response in the terminal of said called party.

5. The method according to claim 3, further comprising the step of
    invoking said other of said circuit-switched response or packet-switched response in the telecommunication network system.

6. A telecommunications system for initiating a communication connection between a calling party and a called party, the called party having a communications terminal capable of participating in a circuit-switched connection and a packet-switched connection, said telecommunications system comprising:
    multiple interconnected networks,
    wherein said telecommunications system is adapted for:
        initiating a circuit-switched connection and a packet-switched connection via separate ones of said multiple interconnected networks;
        alerting a circuit-switched part of the communications terminal of said called party about the initiating of said circuit-switched connection using a first alert signal and alerting a packet-switched part of the communications terminal of said called party about the initiating of said packet-switched connection using a second alert signal; and
        receiving a circuit-switched response at one of said multiple interconnected networks and a packet-switched response at another of said multiple interconnected networks, both the circuit-switched and packet-switched responses being triggered by a single response received from the called party at the terminal at one of the circuit-switched part and the packet-switched part of the communications terminal in response to said first and second alert signals; and
        based on the single response, indicating to the other one of the circuit-switched part and the packet-switched part of the communications terminal whether the communications terminal accepts establishment of a corresponding one of the circuit-switched or packet-switched connections,
        wherein the circuit-switched and packet-switched responses indicate to the respective first and second ones of said multiple interconnected networks:
            whether the packet-switched part of the terminal accepts establishment of said packet-switched connection, and whether the circuit-switched part of the terminal accepts establishment of said circuit-switched connection.

7. The telecommunications system according to claim 6, wherein said telecommunications system is adapted for invoking one of the circuit-switched response or the packet-switched response based on said single response and invoking said other of said circuit-switched response or packet-switched response upon determining said one of said circuit-switched response or packet-switched response has been invoked.

8. The telecommunications system according to claim 7, wherein said telecommunications system is adapted for the invoking of said other of said circuit-switched response or packet-switched response in the communications terminal of said called party.

9. The telecommunications system according to claim 7, wherein said telecommunications system is adapted for the invoking of said other of said circuit-switched response or packet-switched response in the telecommunications system.

10. A telecommunications device for use in a telecommunications system, the telecommunications system being configured for initiating a communication connection between a calling party and a called party associated with the telecommunications device, said telecommunications device comprising:
   a circuit-switched part adapted for receiving a first alert signal alerting the called party about initiation of a circuit-switched connection between the calling party and the called party; and
   a packet-switched part adapted for receiving a second alert signal alerting the called party about initiation of a packet-switched connection between the calling party and the called party,
   wherein said telecommunications device is adapted for:
      detecting a single response from said called party after the receipt of and in response to the first and second alert signals;
      generating a signal in one of said circuit-switched part or packet-switched part of the telecommunications device, triggered by said single response;
      transmitting said generated signal to the other of said circuit-switched part or packet-switched part, said generating signal indicating to the other of said circuit-switched part or packet-switched part whether said called party accepts establishment of a corresponding one of the circuit-switched or packet-switched connections;
      transmitting a circuit-switched response and a packet-switched response to the telecommunications system, both the circuit-switched and packet-switched responses being triggered by said single response,
      wherein the circuit-switched and packet-switched responses indicate to the telecommunications system:
         whether the packet-switched part of the terminal accepts establishment of said packet-switched connection, and
         whether the circuit-switched part of the terminal accepts establishment of said circuit-switched connection.

11. The telecommunications device as claimed in claim 10, wherein said telecommunications device is adapted for accepting both the circuit-switched connection and the packet-switched connection based on said generated signal.

12. The telecommunications device as claimed in claim 10, wherein said telecommunications device is adapted for refusing both the circuit-switched connection and the packet-switched connection based on said generated signal.

* * * * *